US011461619B2

(12) United States Patent
Cheng et al.

(10) Patent No.: US 11,461,619 B2
(45) Date of Patent: Oct. 4, 2022

(54) SPATIO TEMPORAL GATED RECURRENT UNIT

(71) Applicant: NEC Laboratories America, Inc., Princeton, NJ (US)

(72) Inventors: Wei Cheng, Princeton Junction, NJ (US); Haifeng Chen, West Windsor, NJ (US); Dongkuan Xu, State College, PA (US)

(73) Assignee: NEC Corporation

( * ) Notice: Subject to any disclaimer, the term of this patent is extended or adjusted under 35 U.S.C. 154(b) by 428 days.

(21) Appl. No.: 16/787,820

(22) Filed: Feb. 11, 2020

(65) Prior Publication Data
US 2020/0265291 A1 Aug. 20, 2020

Related U.S. Application Data

(60) Provisional application No. 62/807,015, filed on Feb. 18, 2019.

(51) Int. Cl.
*G06N 3/04* (2006.01)
*G06K 9/62* (2022.01)
*G06F 17/16* (2006.01)

(52) U.S. Cl.
CPC ........... *G06N 3/049* (2013.01); *G06F 17/16* (2013.01); *G06K 9/6276* (2013.01); *G06K 9/6296* (2013.01)

(58) Field of Classification Search
CPC ...... G06N 3/049; G06F 17/16; G06K 9/6276; G06K 9/6296
See application file for complete search history.

(56) References Cited

U.S. PATENT DOCUMENTS 10,771,488 B2 * 9/2020 Verma ................... G06N 5/022

OTHER PUBLICATIONS

D. Xu et al., "Adaptive Neural Network for Node Classification in Dynamic Networks," 2019 IEEE International Conference on Data Mining (ICDM), 2019, pp. 1402-1407, doi: 10.1109/ICDM.2019.00181. (Year: 2019).*

Xu, Dongkuan, et al. "Spatio-Temporal Attentive RNN for Node Classification in Temporal Attributed Graphs." IJCAI. 2019. (Year: 2019).*

Chung et al., "Empirical Evaluation of Gated Recurrent Neural Networks on Sequence Modeling", arXiv:1412.3555v1[cs.NE] Dec. 11, 2014, pp. 1-9.

(Continued)

*Primary Examiner* — Fayyaz Alam
(74) *Attorney, Agent, or Firm* — Joseph Kolodka

(57) ABSTRACT

Systems and methods for implementing a spatial and temporal attention-based gated recurrent unit (GRU) for node classification over temporal attributed graphs are provided. The method includes computing, using a GRU, embeddings of nodes at different snapshots. The method includes performing weighted sum pooling of neighborhood nodes for each node. The method further includes concatenating feature vectors for each node. Final temporal network embedding vectors are generated based on the feature vectors for each node. The method also includes applying a classification model based on the final temporal network embedding vectors to the plurality of nodes to determine temporal attributed graphs with classified nodes.

20 Claims, 10 Drawing Sheets

(56) References Cited

OTHER PUBLICATIONS

Hamilton et al., "Inductive Representation Learning on Large Graphs", 31st Conference on Neural Information Processing Systems (NIPS 2017), Dec. 2017, pp. 1-11.

Hochreiter et al., "Long Short-Term Memory", Neural Computation 9(8): 1735-1780, Dec. 1997, pp. 1-32.

Zong et al., "Behavior Query Discovery in System-Generated Temporal Graphs", Proceedings of the VLDB Endowment, Dec. 2015, pp. 240-251, vol. 9, No. 4.

\* cited by examiner

SPATIO TEMPORAL GATED RECURRENT UNIT

RELATED APPLICATION INFORMATION

This application claims priority to U.S. Provisional Patent Application No. 62/807,015, filed on Feb. 18, 2019, incorporated herein by reference in its entirety.

BACKGROUND

Technical Field

The present invention relates to node classification and more particularly to node classification in graph structured data.

Description of the Related Art

Attributed graphs are widely used in real-world applications. Many attributed graphs have been generated because of the rapid growth of information, such as brain graphs, post graphs and co-author graphs. Node classification over attributed graphs aims to classify the node into different categories according to its feature attributes and its connection with other nodes.

SUMMARY

According to an aspect of the present invention, a method is provided for implementing a spatial and temporal attention-based gated recurrent unit (GRU) for node classification over temporal attributed graphs. The method includes computing, using a GRU, embeddings of nodes at different snapshots. The method includes performing weighted sum pooling of neighborhood nodes for each node. The method further includes concatenating feature vectors for each node. Final temporal network embedding vectors are generated based on the feature vectors for each node. The method also includes applying a classification model based on the final temporal network embedding vectors to the plurality of nodes.

According to another aspect of the present invention, a system is provided for implementing a spatial and temporal attention-based gated recurrent unit (GRU) for node classification over temporal attributed graphs. The system includes a processor device operatively coupled to a memory device. The processor device is configured to compute, using a GRU, embeddings of nodes at different snapshots. The processor device performs weighted sum pooling of neighborhood nodes for each node. The processor device also concatenates feature vectors for each node. Final temporal network embedding vectors are generated based on the feature vectors for each node. The processor device applies a classification model based on the final temporal network embedding vectors to the plurality of nodes.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
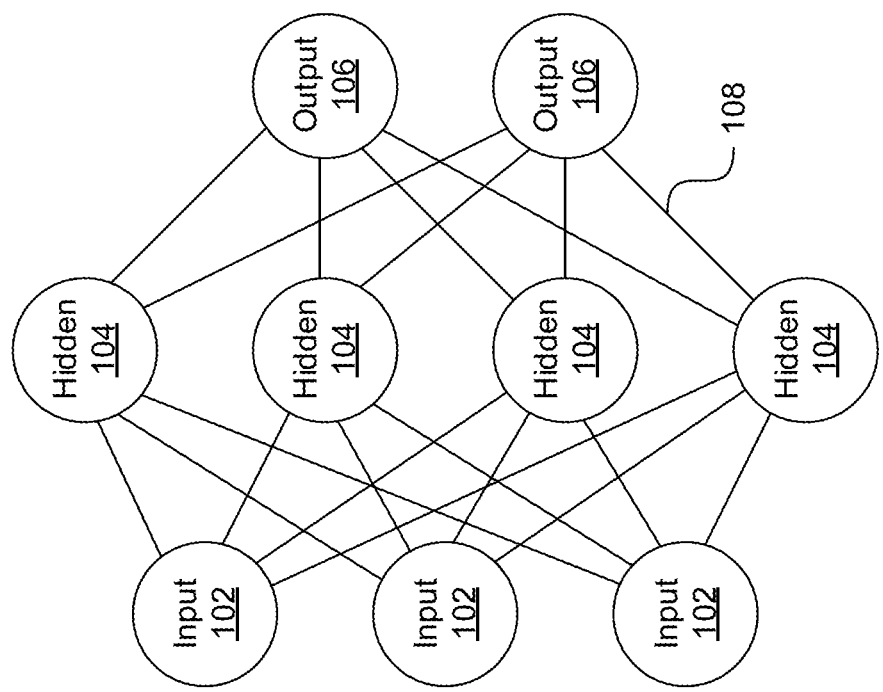
FIG. 1 is a generalized diagram of a neural network, in accordance with an embodiment of the present invention.

In accordance with embodiments of the present invention, systems and methods are provided to/for implementing a spatial and temporal attention-based gated recurrent unit (GRU) network model (STAG) for node classification over temporal attributed graph. The systems model the spatio-temporal contextual information in a temporal attributed graph. The systems distinguish the time steps in the temporal attributed graph (for example, based on relative importance). The node neighbors of a node are used to extract the spatial representation for the node. The systems detect the relative influence of the node neighbors on the target node.

For example, with respect to brain graphs, the representation of one node at one time step is decided by its neighbors and previous time step representation. In the brain network, the neighbors will influence target node with attention weights. The weights are calculated with neighbors features and target node features. The weights can be used to represent the (for example, relative) importance of neighbors to the target node.

In one embodiment, the system learns a function to generate node representation on spatial aspect by sampling and aggregating features from a local neighborhood of the node. The system implements a GRU network to learn the node representation on temporal aspect and integrate the node representation on the temporal aspect with the representation from spatial aspect. The system can further implement a dual attention mechanism on both temporal aspect and spatial aspect to distinguish the (for example, relative) importance of time steps and the node neighbors that influence the node label. The two-attention calculation (dual attention mechanism) is directed towards calculating the importance of neighbors to the target node. The two-attention calculation is also directed towards calculating the importance of time step.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a generalized diagram of a neural network that can implement device failure prediction from communication data is shown, according to an example embodiment.

An artificial neural network (ANN) is an information processing system that is inspired by biological nervous systems, such as the brain. The key element of ANNs is the structure of the information processing system, which includes many highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

ANNs demonstrate an ability to derive meaning from complicated or imprecise data and can be used to extract patterns and detect trends that are too complex to be detected by humans or other computer-based systems. The structure of a neural network generally has input neurons 102 that provide information to one or more "hidden" neurons 104. Connections 108 between the input neurons 102 and hidden neurons 104 are weighted and these weighted inputs are then processed by the hidden neurons 104 according to some function in the hidden neurons 104, with weighted connections 108 between the layers. There can be any number of layers of hidden neurons 104, and as well as neurons that perform different functions. There exist different neural network structures as well, such as convolutional neural network, maxout network, etc. Finally, a set of output neurons 106 accepts and processes weighted input from the last set of hidden neurons 104.

This represents a "feed-forward" computation, where information propagates from input neurons 102 to the output neurons 106. The training data (or, in some instances, testing data) can include data in various application areas, such as speech recognition and machine translation. The training data can be used for node classification in graph structured data as described herein below with respect to FIGS. 2 to 9. For example, the training data can be used in implementing a spatial and temporal attention-based gated recurrent unit network model, STAG, that can generate node representations by considering both the node's temporal pattern and its local neighborhoods of different time steps. The STAG network model can be used for node classification over temporal attributed graph.

The ANNs can be used to implement setting of temporal attributed graphs where each node has a consistent class label across different time steps and the node set is fixed. For example, the label of a company over a period of time, such as promising and unpromising. The graph in that instance can be a transaction graph between companies. The label characterizes the company performance over a period of time. At different time steps, the node attributes are different and the connection between nodes can change, for example, edge deletion or addition. The systems herein classify (for example, some) unknown nodes. The unknown nodes are not known beforehand. For example, to label each node can be time consuming and/or expensive. An administrator can select a few to be labeled by human experts and predict the remaining "unknown" nodes by processes implemented by the ANN to save time and/or expense.

Upon completion of a feed-forward computation, the output is compared to a desired output available from training data. The error relative to the training data is then processed in "feed-back" computation, where the hidden neurons 104 and input neurons 102 receive information regarding the error propagating backward from the output neurons 106. Once the backward error propagation has been completed, weight updates are performed, with the weighted connections 108 being updated to account for the received error. This represents just one variety of ANN.

Figure 2:
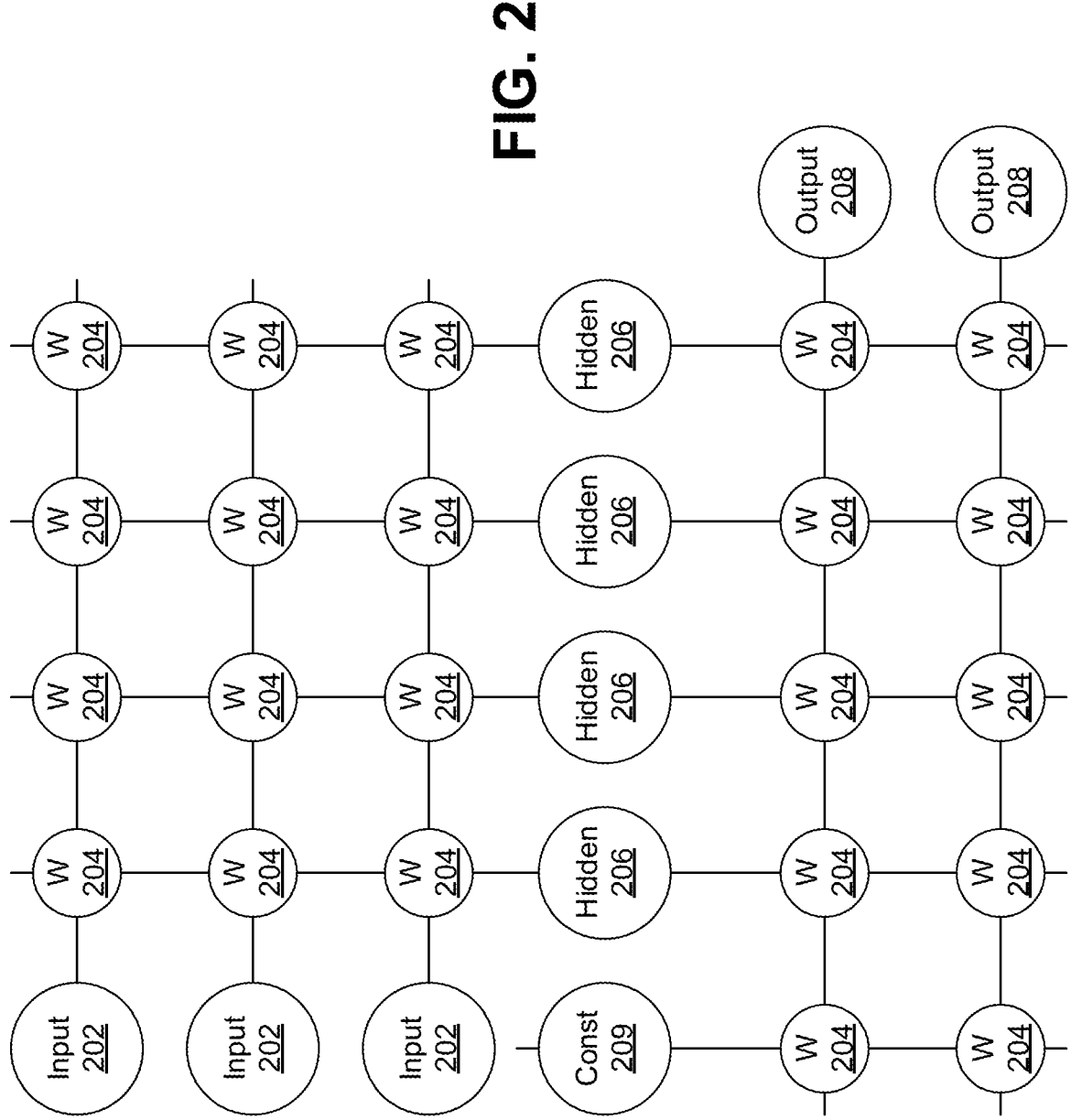
FIG. 2 is a diagram of an artificial neural network (ANN) architecture, in accordance with an embodiment of the present invention.

Referring now to FIG. 2, an artificial neural network (ANN) architecture 200 is shown. It should be understood that the present architecture is purely exemplary and that other architectures or types of neural network may be used instead. The ANN embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, stopmax layers, or any other appropriate type of neural network layer. Furthermore, layers can be added or removed as needed and the weights can be omitted for more complicated forms of interconnection.

During feed-forward operation, a set of input neurons 202 each provide an input signal in parallel to a respective row of weights 204. In the hardware embodiment described herein, the weights 204 each have a respective settable value, such that a weight output passes from the weight 204 to a respective hidden neuron 206 to represent the weighted input to the hidden neuron 206. In software embodiments, the weights 204 may simply be represented as coefficient values that are multiplied against the relevant signals. The signals from each weight adds column-wise and flows to a hidden neuron 206.

The hidden neurons 206 use the signals from the array of weights 204 to perform some calculation. The hidden neurons 206 then output a signal of their own to another array of weights 204. This array performs in the same way, with a column of weights 204 receiving a signal from their respective hidden neuron 206 to produce a weighted signal output that adds row-wise and is provided to the output neuron 208.

It should be understood that any number of these stages may be implemented, by interposing additional layers of arrays and hidden neurons 206. It should also be noted that some neurons may be constant neurons 209, which provide a constant output to the array. The constant neurons 209 can be present among the input neurons 202 and/or hidden neurons 206 and are only used during feed-forward operation.

During back propagation, the output neurons 208 provide a signal back across the array of weights 204. The output layer compares the generated network response to training data and computes an error. The error signal can be made proportional to the error value. In this example, a row of weights 204 receives a signal from a respective output neuron 208 in parallel and produces an output which adds column-wise to provide an input to hidden neurons 206. The hidden neurons 206 combine the weighted feedback signal with a derivative of its feed-forward calculation and stores an error value before outputting a feedback signal to its respective column of weights 204. This back-propagation travels through the entire network 200 until all hidden neurons 206 and the input neurons 202 have stored an error value.

During weight updates, the stored error values are used to update the settable values of the weights 204. In this manner the weights 204 can be trained to adapt the neural network 200 to errors in its processing. It should be noted that the three modes of operation, feed forward, back propagation, and weight update, do not overlap with one another.

A recurrent neural network (RNN) is a class of artificial neural networks that can capture the temporal dependencies of sequential data and learn its representations. The RNN considers both the current data input and its hidden representation at the last time when generating the data's hidden representation at current time.

Gated recurrent unit (GRU) is a subclass of RNNs. The GRU is implemented in a similar manner to long short-term memory (LSTM) units. In contrast to LSTM that has a cell and three information flow gates, GRU simplifies the computation and only has two gates. As more layers using certain activation functions are added to neural networks, the gradients of the loss function approach zero, making the network hard to train (in other words, a vanishing gradient). As implemented within the STAG model, the GRU can reduce (or eliminate) vanishing gradients and capture long-term dependency, and can be used in various application areas, such as speech recognition and machine translation. The STAG network model can further consider the neighborhood information of the input data, such as described herein below with respect to FIGS. 3 to 9.

Figure 3:
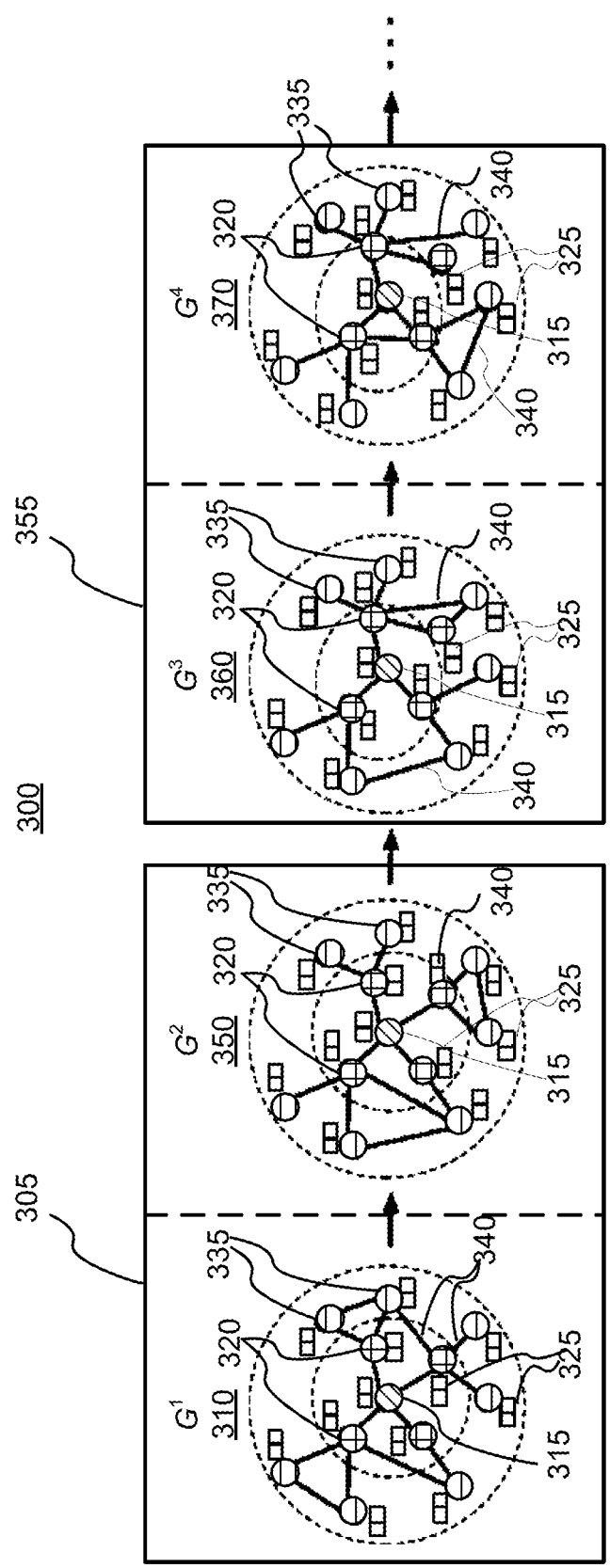
FIG. 3 is a block diagram illustrating temporal attributed graph node classification, in accordance with an embodiment of the present invention.

Referring now to FIG. 3, a block diagram illustrating temporal attributed graph node classification 300, in accordance with example embodiments.

As shown in FIG. 3, each node (for example, 315, 320 335) is one device, with attribute vector denoting the operating attributes of the device, the edge 340 of each graph denotes the communication between two devices. In another embodiment, each node (for example, 315, 320 335) is one company, with attribute vector denoting the financial attributes of the company, the edge 340 of each graph denotes the transaction between two companies. The edge 340 is weighted and directed. $G^1$ (310), $G^2$ (350), $G^3$ (360), $G^4$ (370), . . . are the graphs for different time periods, such as January, February of 2018, etc. The graphs can be generated for testing periods 305 and training periods 355. The system 300 generates a sequence of attributed graphs and the labels 325 of each node. The label 325 is for the whole period of the corresponding node during the training period. The system 300 uses this information for training, and when given another sequence of attributed graphs with the same set of nodes (but different time periods), then predicts the labels of each node.

According to an example embodiment, the attributed graphs represent brain graphs, and each node (for example, 315, 320 335) represents a cube of brain tissue called a voxel, the edge 340 indicates the connectivity between voxels and the node attributes include extra information about the voxel. Brain voxels can be classified into different categories according to their functionality: some are relevant to language processing; some are relevant to emotion processing; and some are relevant to human movement.

Figure 4:
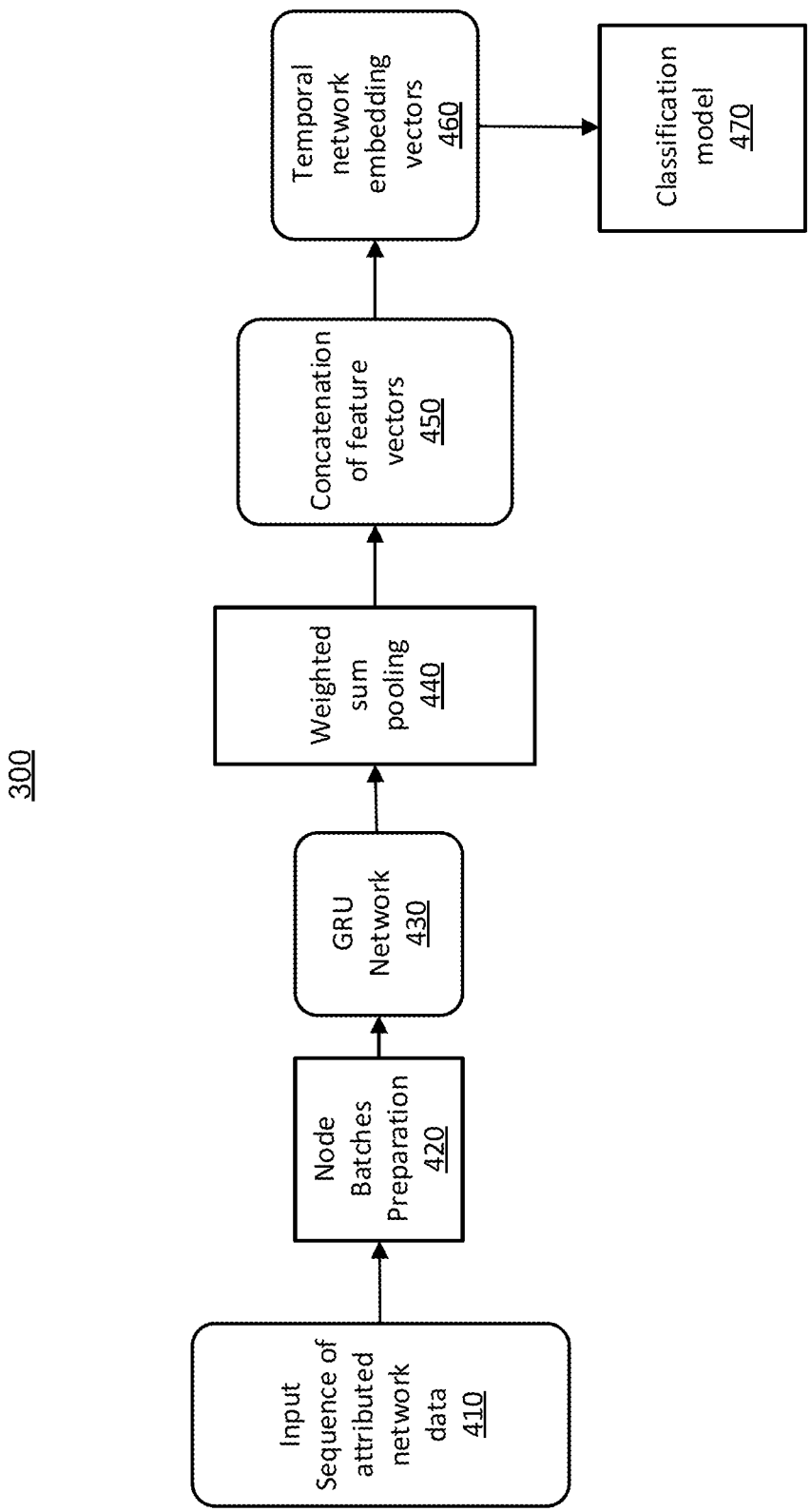
FIG. 4 is a block diagram illustrating a spatial and temporal attention-based gated recurrent unit network, in accordance with an embodiment of the present invention.

Referring now to FIG. 4, a block diagram illustrating a spatial and temporal attention-based gated recurrent unit network, in accordance with example embodiments.

As shown in FIG. 4, system 400 includes components for implementing an input sequence of attributed network data 410, and node batches preparation 420 as described further in detail below with respect to FIG. 5, a GRU network 430 as described further in detail below with respect to FIG. 6, weighted sum pooling 440 as described further in detail below with respect to FIG. 7, concatenation of feature vectors 450 as described further in detail below with respect to FIG. 8, temporal network embedding vectors 460 as described further in detail below with respect to FIG. 9, and a classification model 470. System 400 implements a spatial and temporal attention-based gated recurrent unit network model (STAG). STAG aims to generate node representations by considering both the node's temporal pattern and its local neighborhoods of different time steps.

According to an embodiment, to model the temporal behavior of the input node, the system 400 uses the GRU as a basic framework. The node feature attributes at different time steps are considered as the sequential data and are fed into GRU successively. Then, to generate the hidden representation of the input node at different time steps, the system 400 considers node attributes of the input node at that time step, its hidden representation at a previous time step and its local neighborhood at current time step. The local neighborhood is the aggregation of the node attributes of the node's neighbors. For example, with reference to back to FIG. 3, the local neighborhood of the node 315 is an aggregation of nodes 320 (within the inner circle of each graph). Moreover, the system 400 also implements a dual attention mechanism on both temporal and spatial aspects. Based on the temporal attention, the system 400 can automatically detect which time steps are more important when generating the node representations and put more emphasis on these time steps. Based on the spatial attention, the system 400 can put more emphasis on the neighbors that influence the node more.

The system 400 implements STAG for the node classification over temporal attributed graphs. The system 400 provides interpretable insights on both temporal and spatial aspects for node classification. The system 400 implements a GRU that can integrate the node attributes, its previous hidden representation and its local neighborhood to generate the representation at current time step. The system 400 can be used for any spatio-temporal applications where the relationships among objects evolves over time and the label is dependent on the temporal change of both attributes and topology. The system 400 can be implemented to address all these kinds of applications, for example, temporal graph node classification. The system 400 provides interpretability of results.

Figure 5:
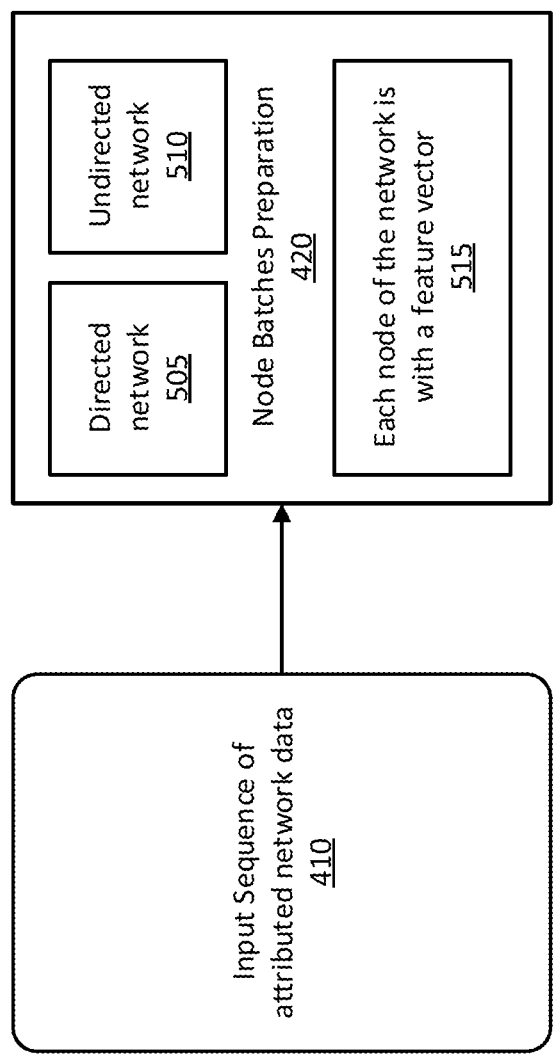
FIG. 5 is a block diagram illustrating preparing node batches from an input sequence of attributed network data, in accordance with an embodiment of the present invention.

FIG. 5 is a block diagram illustrating inputting a sequence of attributed network data and preparing node batches, in accordance with example embodiments.

As shown in FIG. 5, an input a sequence of attributed network data 410, with node labels for 1-t snapshots. Snapshots (or the length of time between snapshots) can be determined at predetermined time instances based on instructions provided by an administrator or by calculating the rate of change of the data associated with the nodes. The network can be either direct 505 or undirected 510. Each node of the network includes a feature vector 515.

The system prepares node batches 420 based on the input sequence of attributed network data 410. To consider the neighborhood information at each snapshot, the system 400 extracts a neighborhood vector for each node to represent its relation information with other nodes at each snapshot. The system 400 can aggregate the representations of the node's neighbors. To consider the representations of the neighbors' neighbors and even 'deeper' (for example, further out, at different degrees of connection) neighbors, the system 400 searches K depth neighbors. Given a set of input nodes B and the search depth K, the system 400 sample the neighbors of these nodes at each depth and construct a sequence of batches of nodes, $B^K$ ... $B^0$. $B^K$ is the input nodes, for example, $B^K$=B. $B^{k-1}$ is the union of $B^k$ and some neighbors of the nodes in $B^k$. The neighbors are sampled by the sampling function N(.). The sampling process is described below. After constructing the batch sequence for each snapshot, the system 400 can generate the neighborhood vectors for all the nodes in B, which is described in the aggregation process herein below. Gk t(v) is the representation of node v during the k-th updating at the t-th snapshot.

The system implements a sampling process as follows:

Input: Temporal attributed graph $\mathbb{G} = (\mathcal{G}^1, \mathcal{G}^2, ..., \mathcal{G}^T)$, A set of input nodes B, Depth K
Output: Batch sequence for each snapshot, $B_t^K$ ... $B_t^0$
1  for t = 1, ..., T do
2  |   $B_t^K \leftarrow B$
3  |   for k = K, ..., 1 do
4  |   |   $B_t^{k-1} \leftarrow B_t^k$
5  |   |   for $v \in B_t^k$ do
6  |   |   |   $B_t^{k-1} \leftarrow B_t^{k-1} \cup \mathcal{N}(v)$
   |   |   ⌊
   |   ⌊
   ⌊

The system implements an aggregation process as follows:

Input: Temporal attributed graph $\mathbb{G} = (\mathcal{G}^1, \mathcal{G}^2, ...., \mathcal{G}^T)$, Batch sequences, $B_t^K$ ... $B_t^0$, t=1,...,T
Output: Neighborhood vector $e_{t(v)}$ for all $v \in B$
1  for t = 1, ..., T do
2  |   $g_{t(v)}^0 \leftarrow x_{t(v)}$, $\forall v \in B_t^0$
3  |   for k = 1, ..., K-1 do
4  |   |   for $v \in B_t^k$ do
5  |   |   |   $g_{N(t(v))}^k \leftarrow AGG_k(\{g_{t(u)}^{k-1}, \forall u \in \mathcal{N}(v)\})$
6  |   |   |   $g_{t(v)}^k \leftarrow \sigma(W^k[g_{t(v)}^{k-1} \oplus g_{N(t(v))}^k])$
   |   |   ⌊
   |   ⌊
7  |   for $v \in B_t^K$ do
8  |   |   $e_{t(v)} \leftarrow AGG_K(\{g_{t(u)}^{K-1}, \forall u \in \mathcal{N}(v)\})$
   |   ⌊
   ⌊

Figure 6:
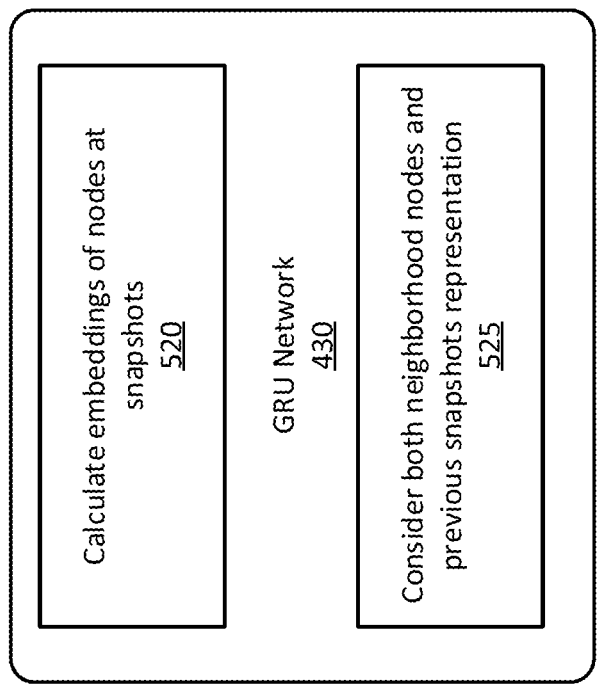
FIG. 6 is a block diagram illustrating a gated recurrent unit (GRU) network, in accordance with an embodiment of the present invention.

FIG. 6 is a block diagram illustrating a GRU network, in accordance with example embodiments.

The system 400 calculates embeddings of nodes at different snapshots (520) (for example, using Eqn. 1, herein below). The embedding of a node is a vector of real values. The embedding will maintain the feature of the node for both features and their topology information. The calculation can consider both neighborhood nodes and previous snapshot's representation (525).

To integrate the node spatial information into GRU network 430, the system 400 implements a spatiotemporal GRU (ST-GRU). For a ST-GRU unit, the inputs include the node attribute at current time, its hidden representation at last time and the vector representation of its neighborhoods. The outputs are the hidden representations of the node at different time steps. The system 400 implements the ST-GRU in a manner that: 1) the generated hidden representations explicitly contain both the temporal information of node attributes and the spatial information encoded in its neighborhoods; 2) a dual attention mechanism can be implemented on both temporal and spatial aspects. Given a sequence of node attributes of the same node at different time steps $x_1, \ldots x_T \in \mathbb{R}^d$ and the vector representations of their neighborhoods $e_1, \ldots, e_t$ in $R^{dg}$, a state vector $h_t \in \mathbb{R}^{d_b}$ is calculated for each node attribute by applying the following equations iteratively, where $h_0 = 0$:

$$z_t = \sigma(W_z[x_t \oplus h_{t-1}] + b_z),$$

$$r_t = \sigma(W_r[x_t \oplus h_{t-1}] + b_r),$$

$$\tilde{h}_t = \tan h(W_h[x_t \oplus (r_t \odot h_{t-1})] + b_h),$$

$$h_t = (1-z_t) \odot h_{t-1} + z_t \odot \tilde{h}_t,  \quad \text{Eqn. (1)}.$$

Eq. (1) describes the calculation process of the three gates that determines which information to throw away and which information to keep when generating the hidden representation of nodes. $W_z, W_r, W_h \in \mathbb{R}^{d_h \times (d+d_h)}$ and $b_z, b_r, b_h \in \mathbb{R}^{d_h}$ are parameters. $z'_t, r_t \in \mathbb{R}^{d_h}$ are update, reset, separately and their values are in the range of [0,1]. $\oplus$ denotes a concatenation operator, ⊙ denotes element-wise multiplication. The concatenation of all the state vectors $[h_1 \oplus \ldots \oplus h_T]$ or the state vector at the last time $h_T$ can be used as the hidden representation for the whole sequence. The system 400 considers the current node attributes $x_t$, its previous hidden representation $h_{t-1}$ and the current neighborhood representation $e_t$ when calculating the gates so that the current node representation is influenced by the node's current attributes, its previous representation and its neighborhoods.

Figure 7:
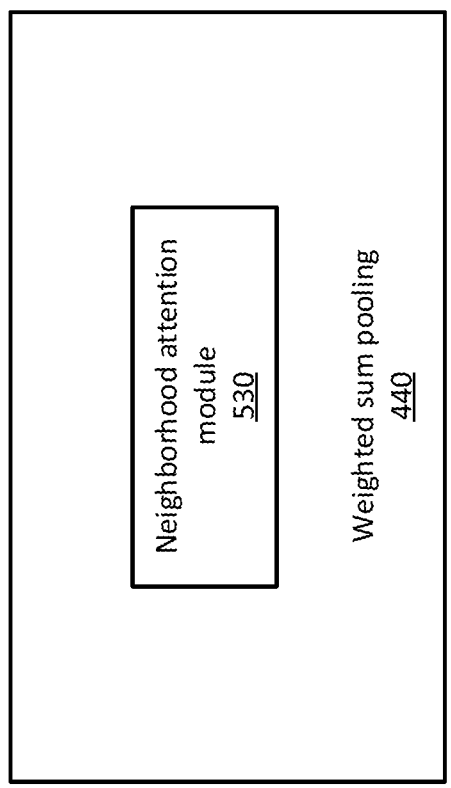
FIG. 7 is a block diagram illustrating a component for implementing weighted-sum pooling, in accordance with an embodiment of the present invention.

FIG. 7 is a block diagram illustrating weighted-sum pooling with attention network for one graph, in accordance with example embodiments.

Different neighbors influence the node differently. The neighbors that share more similarities with the node (for example, usually) influence the node more compared to other neighbors. Attention technique is capable of adaptively capturing the pertinent information. The system 400 implements a neighborhood attention module 530 to detect the important neighbors that influence each node more. The neighborhood attention module 530 can apply Eqns. 2 and 3 (shown herein below) to determine weighted-sum pooling neighborhood nodes. Based on the attention values, the aggregator sums up the neighbors' representations as follows.

$$AGG_k(\{g_{t(u)}^{k-1}, \forall u \in \mathcal{N}(v)\}) = \sum_{u \in \mathcal{N}(v)} \beta_u^{k-1} V_k g_{t(u)}^{k-1}, \qquad \text{Eqn. (2).}$$

Where $\Sigma \beta_u^{k-1} = 1$, and $V_k \in \mathbb{R}^{d_g \times d_g}$ are parameters. $\beta_u^{k-1}$ is the attention value for node u. $V_k$ is the matrix of size $d_g$, and $d_g$ is the dimension size of node embedding. V is a node and N(v) means all neighbors of node v. $AGG_k$ aggregates the neighbors' representations. The attention value indicates the importance of node u to node v compared to other neighbors at depth K-(k-1). $\beta_u^{k-1}$ is produced by neighborhood attention module 530 that takes the representations of the node and its neighbors as inputs, which is described as follows:

$$\beta_u^{k-1} = \frac{\exp\{F(w_k^T [V_k g_{t(u)}^{k-1} \oplus V_k g_{t(v)}^{k-1}])\}}{\Sigma_{v'} \exp\{F(w_k^T [V_k g_{t(v')}^{k-1} \oplus V_k g_{t(u)}^{k-1}])\}}, \qquad \text{Eqn. (3).}$$

where v' in N(v). F(.) is an activation function.

Figure 8:
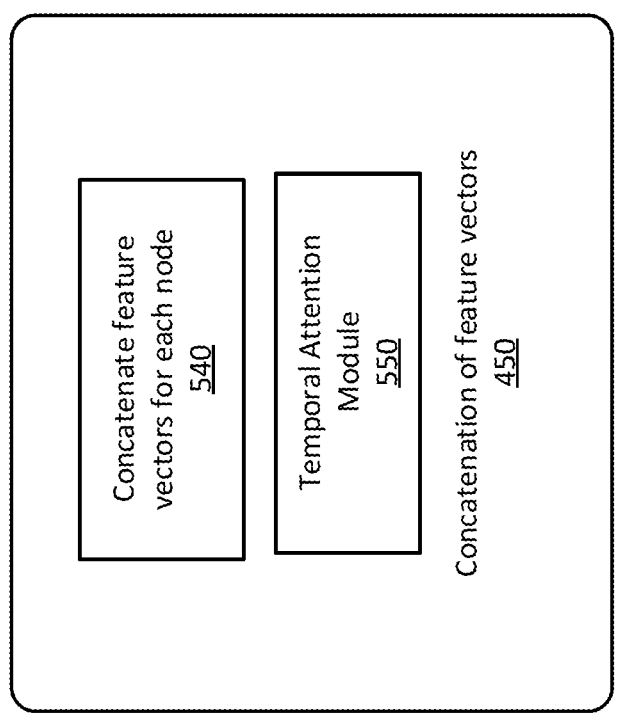
FIG. 8 is a block diagram illustrating a component for implementing concatenation of feature vectors, in accordance with an embodiment of the present invention.

FIG. 8 is a block diagram illustrating weighted-sum pooling with attention network for one graph, in accordance with example embodiments.

The system 400 applies concatenation of feature vectors for each node 540. The concatenation of all the state vectors is denoted as:

$$H = [h_1 \oplus \ldots \oplus h_T] \in \mathbb{R}^{T \times d_h}. \qquad \text{Eqn. (4).}$$

The temporal attention module 550 takes $h_t$ as input and outputs an attention value for $h_t$ as follows.

$$\alpha_t = \frac{\exp\{\tilde{w}^T \tanh(\tilde{V} h_t)\}}{\sum_{i=1}^{T} \exp\{\tilde{w}^T \tanh(\tilde{V} h_i)\}}, \qquad \text{Eqn. (5).}$$

Thus, the attention values of all states can be denoted as $$\alpha = \text{softmax}(w^T \tan h(VH^T)) \in \mathbb{R}^T. \qquad \text{Eqn. (6).}$$

Figure 9:
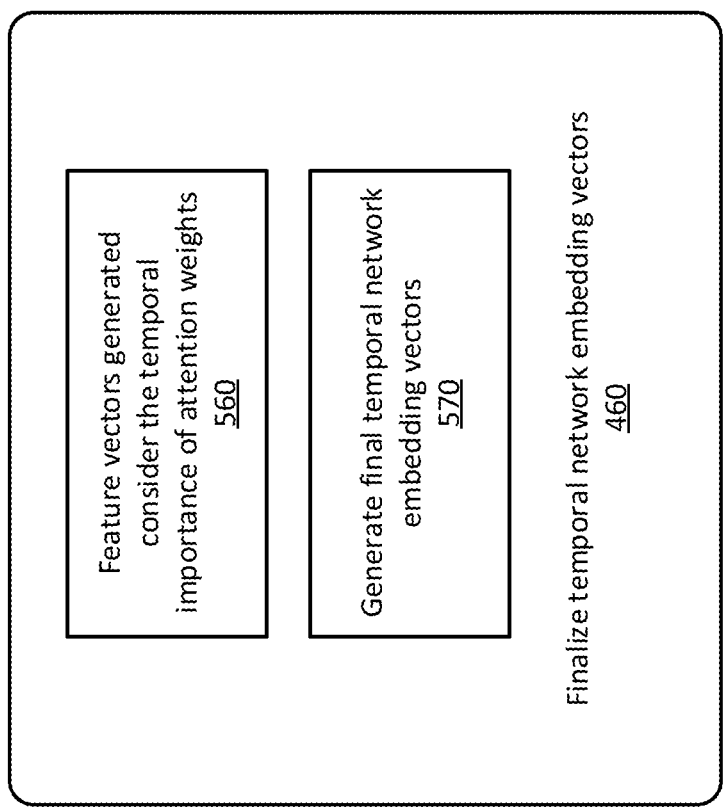
FIG. 9 is a block diagram illustrating finalization of temporal network embedding vectors, in accordance with an embodiment of the present invention.

FIG. 9 is a block diagram illustrating implementation of finalizing temporal network embedding vectors, in accordance with example embodiments.

System 400 generates final temporal network embedding vectors 570. For example, system 400 sums up all the state vectors scaled by to generate a vector representation for the node shown as follows.

$$q = \alpha^T H \in \mathbb{R}^{d_h}. \qquad \text{Eqn. (7).}$$

Herein, α represents attention values for all states, H is a concatenation of all state vectors, h is a state vector and d is the dimension of a final feature vector for each node. The feature vectors generated consider the temporal importance of attention weights 560.

Figure 10:
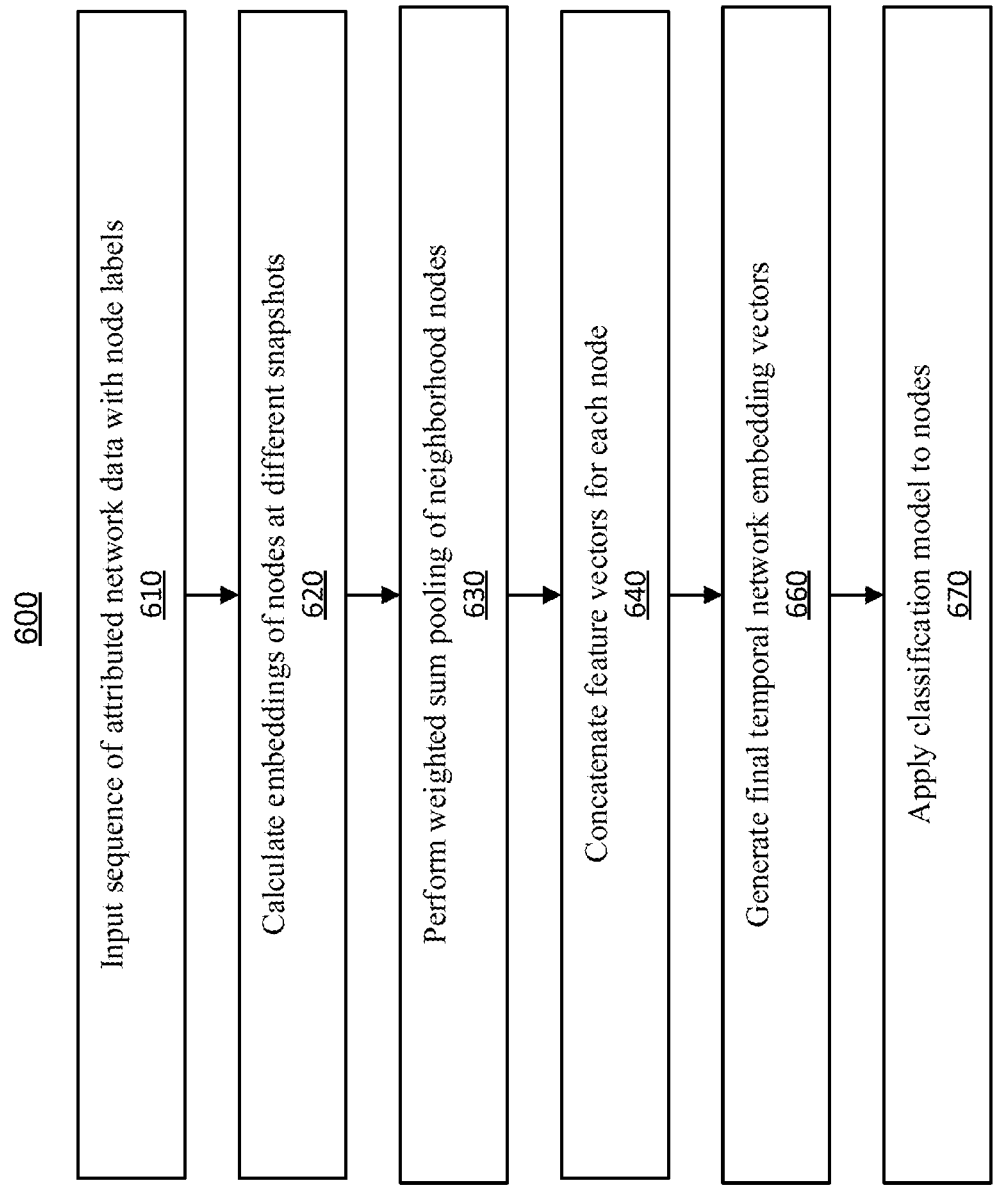
FIG. 10 is a flow diagram illustrating a method for implementing a spatial and temporal attention-based gated recurrent unit for node classification over temporal attributed graphs, in accordance with an embodiment of the present invention.

Referring now to FIG. 10, a method 600 for implementing a spatial and temporal attention-based gated recurrent unit for node classification over temporal attributed graphs is illustratively depicted in accordance with an embodiment of the present invention.

At block 610, system 400 receives an input sequence of attributed network data with node labels. System 400 constructs a sequence of batches of nodes. For example, system 400 can search K depth neighbors, where K is a cardinal number greater than, for example, 2. Given a set of input nodes and the search depth K, the system 400 samples the neighbors of these nodes at each depth and construct a sequence of batches of nodes.

At block 620, system 400 calculates embeddings of nodes at different snapshots. System 400 can implement processes to integrate the node spatial information into the GRU network 430. The inputs to GRU network 430 include the node attribute at current time, its hidden representation at last time and the vector representation of its neighborhoods.

At block 630, system 400 performs weighted sum pooling of neighborhood nodes. For example, system 400 can implement a neighborhood attention process to detect the important neighbors that influence the node more. Based on attention values, system 400 can apply an aggregator that sums up the neighbors' representations.

At block 640, system 400 concatenates feature vectors for each node.

At block 650, system 400 generates final temporal network embedding vectors. For example, system 400 can determine attention values and sum up all the state vectors scaled by α to generate a vector representation for the node.

At block 660, system 400 applies the classification model to nodes. The nodes are classified according to its feature attributes and its connection with other nodes based on the model. For example, with respect to brain graphs, the representation of one node at one time step is decided by its neighbors and previous time step representation. In the brain network, the neighbors will influence target node with attention weights. The weights are calculated with neighbors features and target node features. The weights can be used to represent the (for example, relative) importance of neighbors to the target node.

A brain processing system can incorporate a spatial and temporal attention-based gated recurrent unit for node classification over temporal attributed graphs in accordance with an embodiment of the present invention.

The system receives temporal attributed brain graphs. The brain graphs can include nodes and edges, such as described with respect to FIG. 3, herein above. The temporal attributed brain graphs are input to node classification with a spatial and temporal attention-based gated recurrent unit (GRU) network model (STAG). Node classification over attributed graphs classifies each node into different categories according to its feature attributes and its connection with other nodes. Node classification with STAG determines brain graph with classified functionality. For example, in the brain graphs, a node represents a tidy cube of brain tissue called a voxel, the edge indicates the connectivity between voxels and the node attributes include extra information about the voxel. Brain voxels can be classified into different categories according to their functionality: some are relevant to language processing, some are relevant to emotion processing and some are relevant to human movement. These different brain processing input (data) can be input to brain graph with classified functionality.

Node classification with STAG determines the category of some unknown nodes and determines the underlying functionality of these unknown nodes and their role when interacting with others. With regard to brain graphs representation of the brain, brain consists of voxels. The connectivity between two brain voxels may change when the subject changes into a different task, which results in the edge deletion or addition on brain graphs. Moreover, the node attributes may change over time. For example, the neuron activities within a brain voxel during the periods of different tasks are different.

At different time steps, the node attributes are different and the connection between nodes might change, for example, edge deletion or addition. Node classification with STAG classifies unknown nodes. Node classification with STAG learns the node feature representations on spatial and temporal aspects simultaneously and integrates them into the brain graphs. For the temporal attributed graphs, Node classification with STAG determines the evolution over both spatial and temporal aspects, which are entangled together. Node classification with STAG distinguishes the importance of different time steps for extracting node representation. Different time steps play the different important roles for the nodes and distinguishing the difference helps extract better (for example, more accurate) node representation. When extracting the representation of the target node, node neighbors of the target node are utilized. Different neighbors influence the target node differently. Node classification with STAG detects the node neighbors that influence the representation of the target node to varying degrees to generate more accurate node representation.

The system can be applied to brain function processing and analysis, such as auditory processing, language processing, emotion processing, body movement, etc. The nodes (for example, brain voxels) can be classified based on their underlying functionality and role when interacting with other nodes.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for implementing a spatial and temporal attention-based gated recurrent unit (GRU) for node classification over temporal attributed graphs, comprising:

computing, using a gated recurrent unit (GRU), embeddings of each of a plurality of nodes at different snapshots;

performing weighted sum pooling of neighborhood nodes for each node;
concatenating feature vectors for each node;
generating final temporal network embedding vectors based on the feature vectors for each node; and
applying a classification model based on the final temporal network embedding vectors to the plurality of nodes to determine at least one temporal attributed graph with classified nodes.

2. The method as recited in claim 1, further comprising:
extracting a neighbor vector for each node to represent relation information with others of the plurality of nodes.

3. The method as recited in claim 1, wherein each node represents a brain voxel and the classification model is applied to a system for brain processing based on the at least one temporal attributed graph with classified nodes.

4. The method as recited in claim 3, further comprising:
determining functions of some of the plurality of nodes for at least one of auditory processing, language processing, emotion processing, body movement.

5. The method as recited in claim 1, further comprising:
receiving at least one sequence of attributed network data with node labels for a plurality of nodes; and
preparing node batches based on the attributed network data with node labels.

6. The method as recited in claim 1, further comprising:
integrating node spatial information into the GRU.

7. The method as recited in claim 1, further comprising:
receiving inputs to the GRU for each node, wherein the inputs include a node attribute at current time, a hidden representation at last time, and a vector representation of at least one neighborhood of the node.

8. The method as recited in claim 1, further comprising:
generating outputs, by the GRU, for each node, wherein the outputs include at least one hidden representation of the node at a different time.

9. The method as recited in claim 8, wherein the at least one hidden representation explicitly contains both temporal information of node attributes and spatial information encoded in neighborhoods of the node.

10. The method as recited in claim 1, further comprising:
summing a representation of neighbors of each node by applying:

$$AGG_k(\{g_{t(u)}^{k-1}, \forall u \in \mathcal{N}(v)\}) = \sum_{u \in \mathcal{N}(v)} \beta_u^{k-1} V_k g_{t(u)}^{k-1},$$

wherein $\Sigma \beta_u^{k-1}=1$, and $V_k \in \mathbb{R}^{d_g \times d_g}$ are parameters, k is a search depth, wherein $\beta^k$ represents input nodes and $\beta^{k-1}$ is a union of $\beta^k$ and at least one neighbor of the input nodes in $\beta^k$, $\beta_u^{k-1}$ is an attention value for node u, $AGG_k$ aggregates the representation of the neighbors, $V_k$ is a matrix of size dg, dg is a dimension size of node embedding, and N(v) means all neighbors of node v.

11. The method as recited in claim 1, wherein concatenating the feature vectors for each node further comprises: applying:

$$H=[h_1 \oplus \ldots \oplus h_T] \in \mathbb{R}^{T \times d_h},$$

wherein h is a hidden representation of the node at each time step, H is a concatenation of all state vectors, h is a state vector, and d is at least one dimension of a final feature vector for each node.

12. The method as recited in claim 1, wherein generating the final temporal network embedding vectors based on the feature vectors for each node further comprises:
applying:

$$q=\alpha^T H \in \mathbb{R}^{d_h},$$

wherein α represents attention values for all states, H is a concatenation of all state vectors, h is a state vector, and d is at least one dimension of a final feature vector for each node.

13. A computer system for implementing a spatial and temporal attention-based gated recurrent unit (GRU) for node classification over temporal attributed graphs, comprising:
a processor device operatively coupled to a memory device, the processor device being configured to:
compute, using a gated recurrent unit (GRU), embeddings of each of a plurality of nodes at different snapshots;
perform weighted sum pooling of neighborhood nodes for each node;
concatenate feature vectors for each node;
generate final temporal network embedding vectors based on the feature vectors for each node; and
apply a classification model based on the final temporal network embedding vectors to the plurality of nodes to determine at least one temporal attributed graph.

14. The system as recited in claim 13, wherein the processor device is further configured to:
extract a neighbor vector for each node to represent relation information with others of the plurality of nodes.

15. The system as recited in claim 13, wherein each node represents a brain voxel and the processor device is further configured to:
apply the classification model to a system for brain processing based on the at least one temporal attributed graph with classified nodes.

16. The system as recited in claim 15, wherein the processor device is further configured to:
determine functions of some of the plurality of nodes for at least one of auditory processing, language processing, emotion processing, body movement.

17. The system as recited in claim 13, wherein the processor device is further configured to:
receive inputs to the GRU for each node, wherein the inputs include a node attribute at current time, a hidden representation at last time, and a vector representation of at least one neighborhood of the node.

18. The system as recited in claim 13, wherein the processor device is further configured to:
generate outputs, by the GRU, for each node, wherein the outputs include at least one hidden representation of the node at a different time.

19. The system as recited in claim 18, wherein the at least one hidden representation explicitly contains both temporal information of node attributes and spatial information encoded in neighborhoods of the node.

20. A computer program product for implementing a spatial and temporal attention-based gated recurrent unit (GRU) for node classification over temporal attributed graphs, the computer program product comprising a non-transitory computer readable storage medium having program instructions embodied therewith, the program instructions executable by a computing device to cause the computing device to perform the method comprising:

computing, using a gated recurrent unit (GRU), embeddings of each of a plurality of nodes at different snapshots;
performing weighted sum pooling of neighborhood nodes for each node;
concatenating feature vectors for each node;
generating final temporal network embedding vectors based on the feature vectors for each node; and
applying a classification model based on the final temporal network embedding vectors to the plurality of nodes to determine at least one temporal attributed graph with classified nodes.

\* \* \* \* \*